United States Patent [19]

Camerik

[11] Patent Number: 4,661,940
[45] Date of Patent: Apr. 28, 1987

[54] OPTICAL DISC PLAYER

[75] Inventor: Eduard Camerik, Eindhoven, Netherlands

[73] Assignee: U.S. Philips Corporation, New York, N.Y.

[21] Appl. No.: 649,887

[22] Filed: Sep. 13, 1984

[30] Foreign Application Priority Data

Sep. 19, 1983 [NL] Netherlands ............ 8303217

[51] Int. Cl.⁴ .................... G11B 7/00; G11B 25/04
[52] U.S. Cl. ..................... 369/111; 369/75.2
[58] Field of Search ............ 358/342; 360/97, 99; 369/111, 75.2

[56] References Cited

U.S. PATENT DOCUMENTS

| | | | |
|---|---|---|---|
| 4,403,316 | 9/1983 | Verdonk | 369/44 |
| 4,410,971 | 10/1983 | Eisemann | 369/75.2 |
| 4,464,743 | 8/1984 | Takizawa | 369/75.2 |
| 4,536,865 | 8/1985 | Kenmastsu | 369/75.2 |

*Primary Examiner*—Alan Faber
*Attorney, Agent, or Firm*—F. Brice Faller

[57] ABSTRACT

An optical disc player has a carriage (10) which can be moved to project outside the housing (1) and carries a drive motor (2) having a spindle (4) with means (6) for supporting a disc (40). The player also includes an optical reading device (7) having an optical read head (8) which is movable over the surface of the disc. The reading device (8) is secured in the housing (1) and the housing comprises aligning means (11) which align the spatial position of the rotational axis (3) of the drive motor (2) accurately relative to the optical reading device (7).

4 Claims, 5 Drawing Figures

OPTICAL DISC PLAYER

BACKGROUND OF THE INVENTION

The invention relates to an optical disc player for discs having optically encoded information and comprising: a housing; a drive motor having a rotatable spindle with a free end; disc-supporting means on the spindle for supporting a record disc thereon in a plane perpendicular to the axis of rotation of the spindle; an optical reading device having an optical read head which is movable over the surface of the disc on the spindle and reads the information on the disc by means of a light beam; and a carriage for the drive motor, which carriage is movable between a first position inside the housing, in which position the disc on the spindle can be read by means of the optical read head, and a second position in which the carriage projects from the housing and a disc can be placed on the spindle and removed from the spindle.

Such optical disc players are marketed in, for example, the form of optical audio disc players in several models. During playing of a record disc, the reading device is very near the disc and is always kept in its correct position by means of an electronic servomechanism. It is of prime importance that the spatial position of the spindle on which the disc is placed is determined very accurately relative to the optical reading device. Sometimes the movable optical read head is supported by a swinging arm, for example in the optical disc player disclosed in European patent application No. 0074131 to which U.S. Pat. No. 4,403,316 corresponds (hereby incorporated by reference). The optical read head may alternatively be carried by a slide capable of translation in the radial direction.

It is highly desirable that the disc placed on the spindle rotates in a plane which is accurately parallel to the plane in which the optical read head is moved over the surface of the disc by the optical reading device. With the above-mentioned prior art optical disc player not only the drive motor but also the complete optical reading device is moved outwards with the carriage. This has the advantage that the drive motor and the optical reading device can be arranged on the same portion of the disc player in mutually accurately aligned positions. It has, however, the disadvantage that the sensitive optical reading drive has to be moved to the exterior of the housing, where it may be damaged by external influences. In addition, a rather large number of flexible connections must be provided between the optical reading device and the electronic circuits cooperating therewith which are in a fixed position in the housing of the optical disc player.

Optical disc players are known which deviate from the construction described in the opening paragraph and in which the above-mentioned disadvantages are obviated by arranging both the drive motor and the optical reading device in a fixed position in the housing. To enable a disc to be placed on the player a transfer means on which the disc can be placed is moved outwards. Thereafter the transfer means is moved inwards and placed on the spindle of the drive motor by a mechanism incorporated in the housing of the disc player. This requires an additional mechanism in the housing for transferring the disc to the spindle of the drive motor. Also, extra space in the housing is required for moving the disc up and down.

SUMMARY OF THE INVENTION

The invention has for its object to provide an optical disc player of the type set forth in the opening paragraph which combines the advantages of the two known types of disc players whilst obviating the disadvantages, and is characterized in that the optical reading device is secured in the housing, and the housing contains aligning means which, when the carriage is in the first position, cooperate with the drive motor to align the spatial position of the axis of rotation of the spindle accurately relative to the optical reading device. In the optical disc player according to the invention the drive motor and the optical reading device move relative to one another and can therefore be arranged in different portions of the optical disc player. The unavoidable play between these portions which is necessary to permit movement of the carriage, and also the unavoidable inaccuracies in the alignment of the drive motor and the optical reading device due to the large number of components to be interconnected which are present between the drive motor and the reading device, no longer have an adverse influence since in the first position of the carriage the drive motor, which is then inside the housing, is accurately aligned relative to the optical reading device by means of the alignment means.

An advantageous embodiment of the invention may be characterized in that the aligning means comprise alignment stops which are secured in fixed positions in the housing and cooperate with the casing of the drive motor when the carriage is in the first position, and in that spring means are arranged to hold the drive motor resiliently against the alignment stops in the first position of the carriage. With high-grade drive motors it is often customary to machine the outer surface of the casing of the motor and the bearings or the bearing housings on a lathe, once they have been mounted on the lathe, in one cycle. Thus, the housing and the spindle are automatically coaxial to a very high degree with such motors. Aligning the drive motor by means of the alignment stops cooperating with the casing of the drive motor consequently automatically results in a good alignment of the rotational axis of the spindle.

Advantageously, a further embodiment of the invention can be used which is characterized in that: the carriage is supported by bearings with some play with respect to the housing; the drive motor is secured to the carriage; the carriage carries a slide member which is bearing-supported so as to be movable relative to the carriage to a limited extent in the direction of movement of the carriage; and spring means are provided on the carriage to load the slide member resiliently in a direction towards the second position. Latching means are provided in the housing, which latching means, in the first position, latch the slide member in the housing against the resilient loading of the spring means, so that when the carriage moves from the second to the first position, first the drive motor comes into contact with the alignment stops and thereafter the slide member can be pushed further in a direction opposing the load of the spring means until the latching means become operative. The play of the carriage relative to the housing is used in a positive sense to provide the drive motor with the freedom of movement in all directions necessary for aligning it relative to the reading device. In addition, the spring means are also used to lock the carriage in its first position.

To make best use of the available space in the housing a further embodiment of the invention is of interest, which is characterized in that the optical reading device is disposed in the housing in a position facing the free end of the spindle when the carriage is in the first position. An additional advantage of this embodiment is that at the side where the disc must be placed on the disc-supported means on the spindle, the carriage may be wholly enclosed, which is to be preferred not only from an aesthetic but also from a technical point of view.

A further very important advantage is that the disc-supporting means of the spindle and also the drive motor itself cannot obstruct the reading or writing the information on the disc by means of the optical head. Thus, it is possible to use a flat drive motor of large diameter, the axial projection of which onto the disc covers an area of the disc in which it must be possible to read or write information. Also in the choice of the diameter of the disc supporting means there is a large degree of freedom. Thus, it is possible to read with a single reading device both optical audio discs and optical video discs in accordance with the "Compact Disc" or "Laservision" standards, respectively. The projection onto a disc of the disc-supporting means necessary for supporting a video disc partly cover the portion of an audio disc having audio tracks.

DETAILED DESCRIPTION OF THE PREFERRED EMBODIMENT

Figure 1:
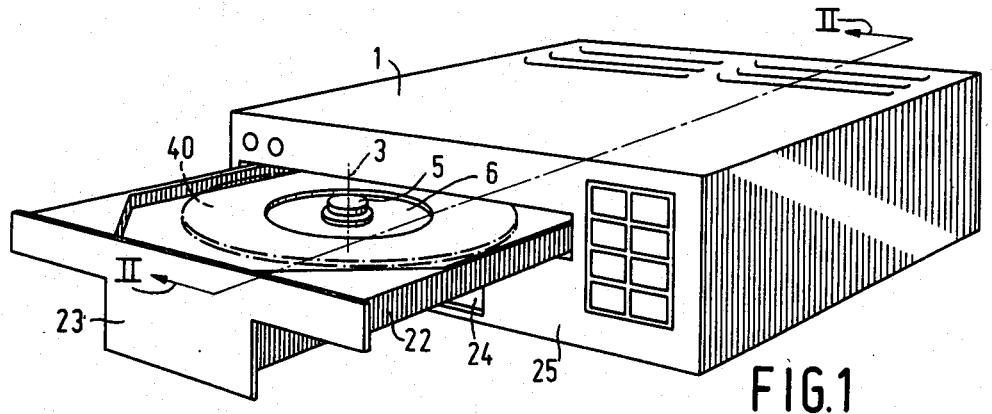
FIG. 1 is a perspective view of an optical disc player showing the carriage moved to the second position in which it projects from the housing.
Figure 2:
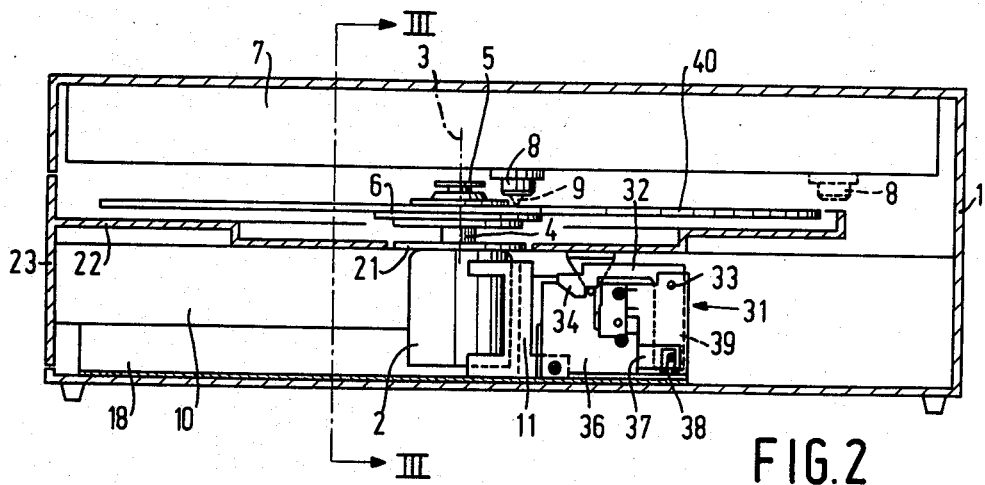
FIG. 2 is a sectional view taken on the line II—II in FIG. 1, albeit in the first position.
Figure 3:
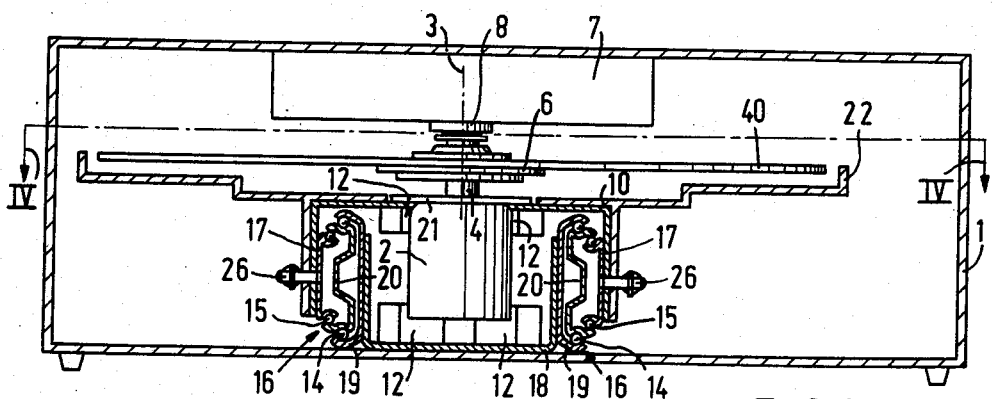
FIG. 3 is a sectional view taken on the line III—III in FIG. 2.
Figure 5:
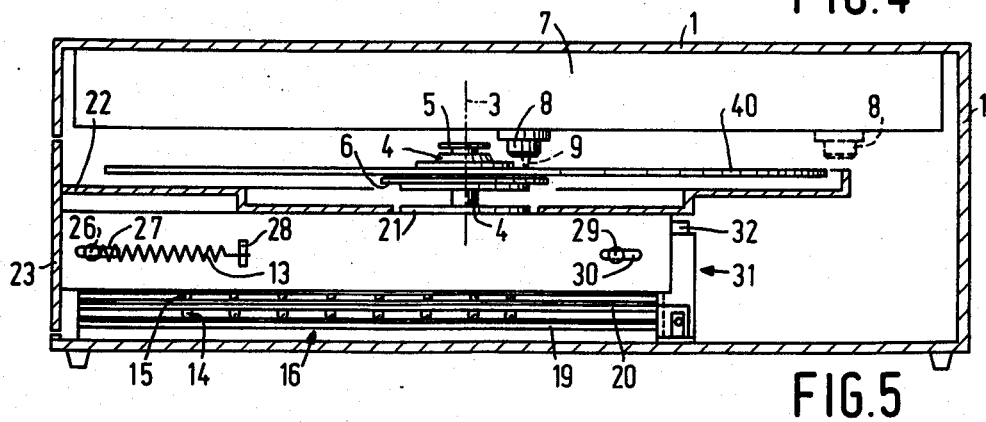
FIG. 5 is a sectional view taken on the line V—V in FIG. 4, with part of the slide member removed.

Referring to FIGS. 1 and 2, the optical disc player comprises a housing 1 and a drive motor 2 having a spindle 4 which is rotatable around an axis 3 and has a free end 5. The spindle is provided with a turntable 6 for supporting a record disc 40 in a plane perpendicular to the rotational axis 3. An optical reading device 7 is shown in the drawing as a box-shaped unit and has an optical read head 8 which is movable over the surface of the disc 40 for reading the information on the disc with the aid of a light beam 9. In FIGS. 2 and 5 the optical read head is shown in full lines in its position closest to the centre of the disc and in dotted lines in its position furthest from the centre of the disc.

Figure 4:
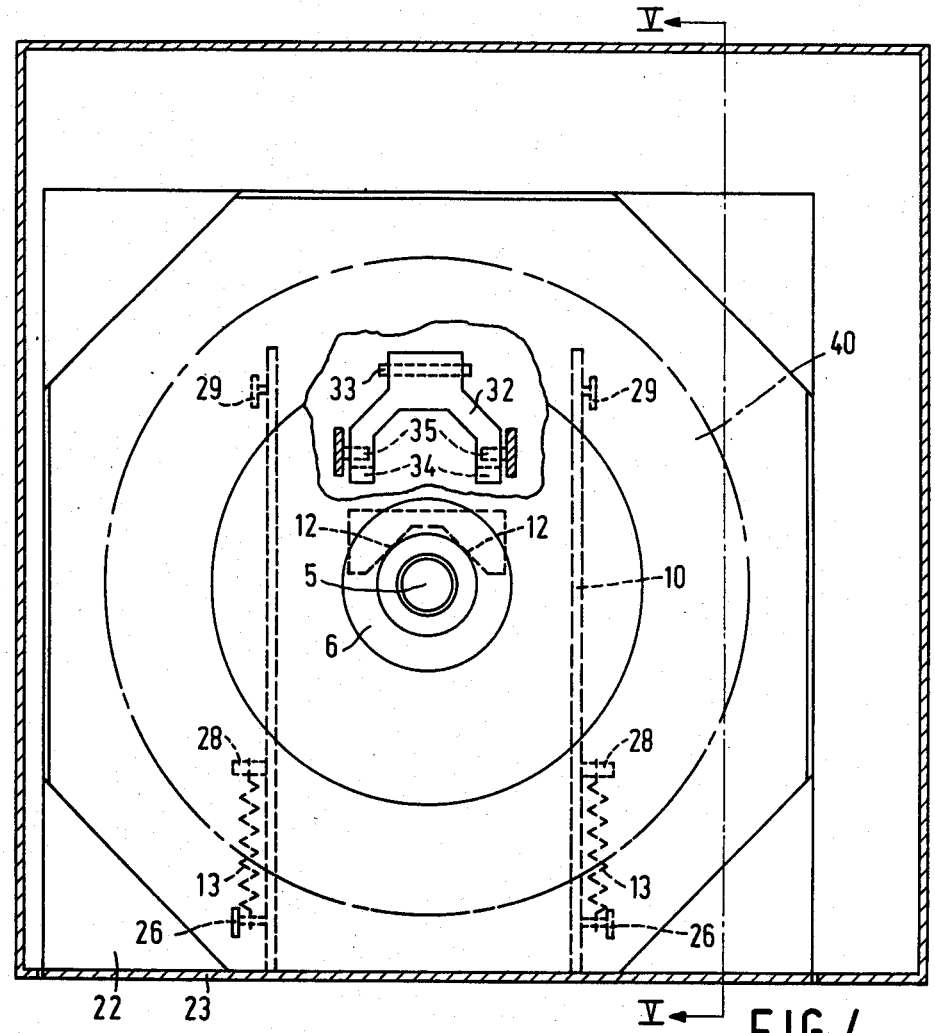
FIG. 4 is a sectional view taken on the line IV—IV in FIG. 3.

The drive motor 2 is fixed to a carriage 10 which is movable between a first position inside the housing 1 (see FIGS. 2, 4 and 5), in which position the disc 40 on the turntable 6 can be read with the optical read head 8, and a second position (see FIG. 1) in which the carriage projects from the housing so that a disc can be placed on the spindle and removed from the spindle.

The optical reading device 7 is secured in the housing. In addition, the housing contains aligning means 12 which, when the carriage 10 is in the first position, cooperate with the drive motor 2 to align the spatial position of the rotational axis 3 accurately with respect to the optical reading device 7.

The aligning means 11 comprise aligning stops 12 which cooperate with the casing of the drive motor 2 when the carriage 10 is in the first position. These alignment stops are constituted by the side walls of two aligned, vertically spaced V-shaped recesses in a single alignment block made of metal. This block is rigidly connected to the housing 1 by fastening means, not shown, and is accurately aligned with respect to the optical reading device 7 with the aid of suitable means, not shown. Spring means in the form of two tension springs 13 are provided to hold the drive motor 2 resiliently against the alignment stops 12 when the carriage 10 is in the first position.

The carriage 10 is supported with some play relative to the housing 1 by means of a telescopic bearing arrangement 16 comprising ball bearings 14 and 15. In addition to these balls 14 and 15 the telescopic bearing arrangement comprises, at each lateral side of the carriage, a portion 17 which is secured to the carriage 10, a portion 19 which is secured to a side wall of a channel-shaped member 18, and also an intermediate portion 20. The channel-shaped member 18 is rigidly connected to the bottom of the housing 1 and carries, inter alia, the aligning means 11. The carriage 10 is mainly constituted by an inverted channel-shaped member which with its transverse portion covers the open upper side of the member 18. By means of a flange 21 the drive motor 2 is secured to the carriage 10 with fastening means, for example screws, not shown.

The carriage 10 carries a slide member 22 which is made of a plastics material and which is bearing-supported so as to be movable relative to the carriage to a limited extent in the direction of movement of the carriage. A portion 23 at the front of the slide member 22 constitutes a cover for an opening 24 in a front wall 25 of the housing. To the rear of the front portion 23 the slide member 22 comprises a shallow recess for accommodating a disc 40. At one end the two tension springs 13 are connected to pins 26 which project from the side walls of the carriage 10 through slots 27 in the side walls of the slide member 22. The other ends of the tension springs 13 are connected to projections 28 on the side walls of the slide member 22. Thus, the slide member is spring-loaded relative to the carriage 10 by the tension springs 13 in a direction towards the second position, that is to say in an outwardly directed sense. As each pin 26 is accommodated in an associated one of the slots 27, a limited degree of relative movement is possible between the slide member 22 and the carriage 10. A second set of pins 29 on the side walls of the carriage 10 engaging slidably in slots 30 in the side walls of the slide member provide a proper guidance of the slide member.

When the carriage 10 is in the first position inside the housing 1 the slide member 22 is latched against the resilient load of the tension springs 13 by a latching means 31 provided in the housing. The latching means (see more specifically FIGS. 2 and 4) comprises a bifurcate lever 32 which is pivotable around a pin 33. Each limb of the lever 32 has a latch hook 34 at its free end. These two latch hooks cooperate with two pins 35 on the under side of the slide member 22. When the carriage 10 is moved from the second to the first position, first the drive motor 2 is brought into contact with the alignment stops 12 and thereafter the slide member 22 is pushed further inwards against the load of the tension springs 13 until the latching means 31 become operative by the latch hooks 34 engaging over the pins 35. Thus, the tension springs 13 serve both for holding the drive motor against the alignment stops and for securing the whole assembly formed by the carriage 10 and the slide member 22 in the housing in a stable manner without undue play.

For unlatching the carriage an electromagnet 36 is provided having a plunger 37 (FIG. 2). This plunger cooperates with an arm 39 of the lever 32 via a pin 38. When the magnet is energized the plunger 37 moves from right to left, as viewed in FIG. 2, causing the lever 32 to pivot around the pin 33 so that the two latch hooks 34 are lifted out of engagement with the pins 35 on the slide member 22. Under the influence of the tension springs 13, the slide member 22 now moves outwards through a small distance, so that the front portion 23 of the slide member 22 project slightly from the housing and can be gripped with the hand to move the carriage 10 manually further from the housing to the second position. It is possible to modify the optical disc player shown so that the carriage 10 is moved by an electric motor between the first and second positions.

In the illustrated embodiment of the optical disc player according to the invention there is a great deal of space beneath the carriage 10 for accommodating component parts such as the aligning means 11 and the latching means 31. This is due to the fact that the optical reading device 7 is located in a position facing the free end 5 of the spindle 4 when the carriage 10 is in the first position.

Still further embodiments are possible within the scope of the invention as defined in the following claims. Thus, it is possible to provide the drive motor with play in the carriage in order to ensure the required mobility of the drive motor relative to the aligning means. When alignment stops are used it is possible to hold the motor in a different way against the alignment stops using spring-loaded means. Thus, it would be possible to hold the drive motor against the alignment stops by means of a resilient lever when the carriage is in the first position and to pivot the lever when the carriage is moved from the first to the second position. It could be advantageous to secure the aligning means and the reading devices on a solid frame made in one piece. Alignment stops, if provided, may be formed by portions of the frame.

What is claimed is:

1. An optical disc player for discs carrying opticaly encoded information and comprising:
   a housing (1),
   a drive motor (2) having a casing and a rotatable spindle (4) with a free end (5),
   a disc-supporting means on the spindle for supporting a record disc (6) thereon in a plane perpendicular to the axis of rotation (3), of the spindle,
   an optical reading device (7) having an optical read head (8) which is movable over the surface of the disc (6) on the spindle and reads the information on the disc by means of a light beam (9), and
   a carriage (10) for the drive motor (2), which carriage is movable between a first position inside the housing (1), in which position the disc on the spindle can be read by means of the optical read head, and a second position in which the carriage projects from the housing and a disc can be placed on the spindle and removed from the spindle, characterized, in that
   the optical reading device (7) is secured in the housing, and
   aligning means (11) are fixed in the housing, which means, when the carriage (10) is in the first position, cooperate with the drive motor (2) to align the spatial position of the axis of rotation (3) of the spindle accurately relative to the optical reading device.

2. An optical disc player as claimed in claim 1, characterized in that
   the aligning means (11) comprise alignment stops (12) which are secured in fixed positions in the housing and cooperate with the casing of the drive motor (2) when the carriage (10) is in the first position, and
   spring means (13) are arranged to hold the drive motor (2) resiliently against the alignment stops (12) when the carriage (10) is in the first position.

3. An optical disc player as claimed in claim 2, characterized in that
   the carriage (10) is supported by bearings with some play with respect to the housing (1),
   the drive motor (27) is secured to the carriage (10),
   the carriage (10) carries a slide member (22) which is bearing supported so as to be capable of limited movement relative to the carriage in the direction of movement thereof,
   spring means (13) are provided on the carriage (10) to load the slide member (22) resiliently in a direction towards the second position, and
   latching means (31) are provided in the housing, which latching means, in the first position, latch the slide member (22) in the housing against the resilient loading of the spring means (13), so that when the carriage (10) moves from the second to the first position, first the drive motor (2) comes into contact with the alignment stops (12) and thereafter the slide member (22) can be pushed further against the load of the spring means (13) until the latching means (31) become operative.

4. An optical disc player as claimed in claim 1, characterized in that the optical reading device (7) Is located in the housing (1) in a position facing the free end (5) of the spindle (4) when the carriage (10) is in the first position.

* * * * *